June 12, 1928.

M. BICHEROUX 1,673,138

APPARATUS FOR MAKING HIGH GRADE PLATE GLASS

Filed Feb. 7, 1924     2 Sheets-Sheet 1

Inventor:
Max Bicheroux
by
Attorney

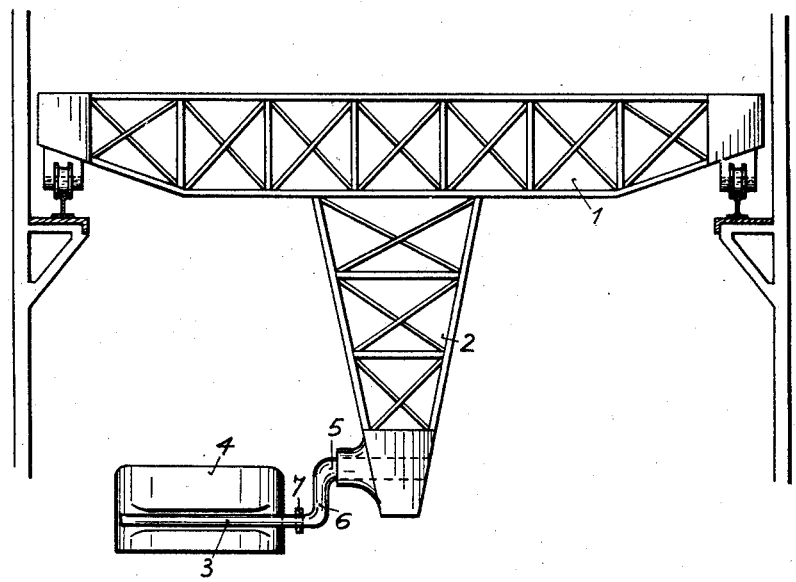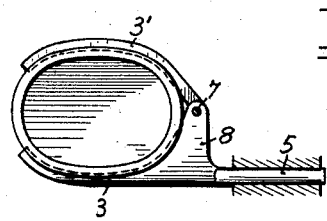

Patented June 12, 1928.

1,673,138

UNITED STATES PATENT OFFICE.

MAX BICHEROUX, OF AIX-LA-CHAPELLE, GERMANY, ASSIGNOR TO MAATSCHAPPY TOT BEHEER EN EXPLOITATIE VAN OCTROOIEN, OF AMSTERDAM, NETHERLANDS.

APPARATUS FOR MAKING HIGH-GRADE PLATE GLASS.

Application filed February 7, 1924, Serial No. 691,187, and in Germany March 2, 1923.

My invention refers to the art of glass making, and more particularly of casting and rolling glass of high quality free from streaks, bubbles and other flaws, and it especially concerns the way in which the molten glass is transferred from the furnace to the casting or rolling table or other support on which it shall be brought into shape.

It is an object of my invention to so improve the handling of the molten glass, as it is deposited on any such support, that its homogeneity will not be impaired and a homogeneous flawless lump of glass formed on the table and presented to the rolls or other shaping tools.

It is well known to those skilled in the art of glass making that, if it is intended to make large glass sheets or plates by casting or rolling or otherwise, instead of transferring the quantity of glass required in each operation from the furnace to the casting or rolling table by means of a pipe, ladle or the like, as is the practice in making smaller articles such as tiles or the like, the melting pot filled with molten glass is lifted bodily from its seat in the furnace by means of a large fork or the like and carried to the working place, there to be overturned in order to pour all the molten glass contained therein onto the casting or rolling table or other support.

The handling of such large mass of molten glass and of the large melting pot containing them involves quite a number of drawbacks which tend to impair the quality of the glass, as it is poured out on the table, so that a sheet or plate obtained by rolling out the plastic lump of glass will, as a rule, be defective, inasmuch as streaks, air bubbles and other flaws are formed and foreign matter is admixed to the plastic glass which impair the commercial value of the glass and render many portions of the sheet or plate unfit for sale.

Most of the drawbacks mentioned above occur as a result of the way in which the melting pot containing the molten glass is being handled for the pouring out of the glass. In more particularly explaining the mode hitherto practiced and in what manner I succeed in overcoming the difficulties connected therewith, reference shall be had to the drawings annexed to this specification and forming part thereof, in which Figs. 1 to 3 serve to illustrate the pouring method hitherto practiced, while Figs. 4 to 8 disclose my invention.

In the drawings

Fig. 1 illustrates in a purely diagrammatic manner a large melting pot filled with molten glass immediately before the pouring out, as hitherto practiced, while

Figs. 7 and 8 are diagrammatic views of a device adapted for carrying out the novel method, Fig. 7 being a side elevation, while Fig. 8 is a plan view of the melting pot and the fork serving to handle same.

Figure 1:
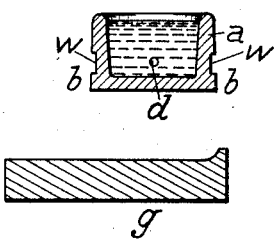
Figure 2:
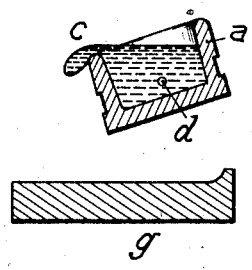
Fig. 2 is a similar view showing the pot and the glass at the moment when pouring is started, Fig. 3 being illustrative of the way in which the pot is emptied altogether.
Figure 3:
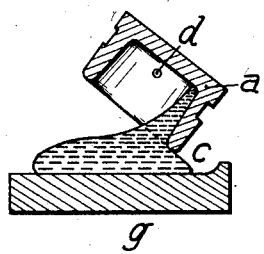

Referring first to Figs. 1 to 3 of the drawings, a full melting pot $a$ is here shown as being lifted above the casting or rolling table or other support $g$, this operation being as a rule effected by means of a fork (not shown) which grips the pot at opposite sides somewhat above its bottom, as shown by the indentions $w$ provided in the pot for this purpose. By turning the fork about its axis which meets the pot in the point $d$, the glass is caused to flow over that side wall of the pot which is being lowered (Fig. 2), and by entirely overturning the pot, as shown in Fig. 3, all the glass contained therein is poured out.

With this mode of operating, as shown in the drawings, the turning axis must be situated rather high above the casting table and consequently with the pot three feet high the upper edges will be about six feet above the table. Thus, when the glass begins to flow over the upper edge of the pot, as shown in Fig. 2, it will drop onto the table a distance of several feet and in consequence thereof the mass of molten glass, which until then was comparatively homogeneous and free of streaks and bubbles, will be drawn out and torn even and the several superposed layers of glass in the pot will be displaced relatively to one another, whereby eddies are formed between these layers which will appear in the lump of glass deposited on the table in the form of streaks and the like and will not be got rid of in the rolling operation, if any such operation is practiced on the lump of glass. Moreover, the supernatant layer or skin covering the contents of the pot, which is as a rule soiled by furnace dust or the like, is driven into the interior of the lump formed in pouring and is also likely to carry particles of air with it, whereby the quality of the glass is further deteriorated. If, during the pouring operation, the pot is moved across the table, as is frequently done in order to better distribute the glass on the table, the formation of the eddies and the danger of tearing the glass mass and of impairing its homogeneity is further increased.

The outer surface of the melting pot being always covered with the dust from the furnace and having particles of spilt and solidified glass adhering to it, when the pot is suspended above the table, as shown in the drawings, particles of this dust and solid glass are likely to fall down and to mix with the glass poured out, whereby a further source of trouble is created, which cannot be fully avoided by cleaning the outer surface of the pot before lifting it above the table, too little time being left for such cleaning operation, in view of the necessity of pouring the glass within certain restricted limits of temperature.

In order to do away with all these drawbacks and to pour the glass from the pot onto the table in such way as to obtain a lump of plastic glass free from streaks and other flaws, I operate as follows: Instead of lifting the pot above the table and turning it about an axis extending in line with its middle axis, I place the pot in close proximity to an edge, which may be the front edge, of the casting or rolling table or other support and I then cause the pot to turn in a circle about an axis extending substantially in a line or tangentially of the outer wall of the pot which adjoins the table and preferably near that upper edge of the pot which the glass shall flow over.

Figure 4:
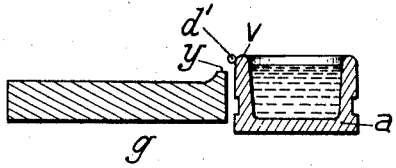
Fig. 4 is a purely diagrammatic view of the melting pot filled with molten glass in position near the casting or rolling table or other support before pouring the glass in accordance with my present invention.
Figure 5:
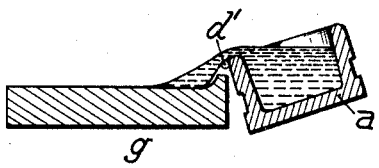
Fig. 5 is a similar view showing the parts in the position which they assume immediately after the pouring operation has been started.
Figure 6:
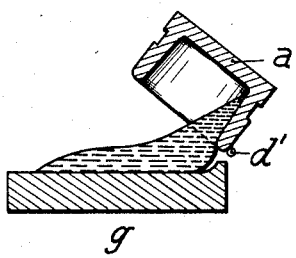
Fig. 6 is a diagram of the pot at the time when it is almost emptied and its whole content is poured out onto the support.

A preferred mode of carrying out my novel method is illustrated diagrammatically in Figs. 4 to 6. In Fig. 4 the melting pot $a$ is shown in position near the front edge of the table $g$ and with the overflow edge $v$ at a slightly higher level than the upper edge $y$ of the table. If now the pot is tilted about the axis $d'$ extending near the overflow edge, the glass flowing over this edge, instead of dropping from a certain height onto the table, as in Fig. 2, will simply flow out in an uninterrupted stream, and if the tilting is effected quickly, the whole contents of the pot will be deposited on the table as a coherent mass without being torn or agitated and without giving the several superposed layers of glass any opportunity of displacing themselves relatively to each other. In, fact, by quickly overturning the pot, the glass contained therein can now be simply turned out and deposited on the table upside down, being evenly distributed thereon under the action of gravity.

This novel mode of handling and tilting the pot can be practiced in a particularly easy and effective manner by means of a device such as shown by way of example in Figs. 7 and 8. 1 is a travelling crane running on overhead track and 2 is a melting pot guide suspended from the crane and carrying near its lower end the fork 3 gripping the melting pot 4. Cranes of this kind are used in a number of plate glass works for extracting the pots from the furnace and for transporting them to the rolling table.

According to the present invention, now, the fork gripping the melting pot has its handle 5 bent twice at right angles, the gripping members 3—3' being placed at a lower level than the handle 5 and being connected thereto by means of a vertical arm 6, the length of which is preferably so chosen that, when the melting pot is gripped by the fork near its bottom as usual, the longitudinal axis of the handle 5 extends substantially in the plane of the overflow wall of the pot and preferably in line with the upper edge of this wall which the glass shall flow over. To this end the arm 6 is not fixed to the gripping members 3—3' near their pivot 7, but at a point in line with the member 3, as shown in Fig. 8, this member being formed with a lateral extension 8 disposed substantially at right angles and having the part 3' pivoted to its free end.

Obviously, if the fork gripping the melting pot is made to turn about the longitudinal axis of the handle 5, the pot will be tilted about its overflow edge, as shown diagrammatically in Figs. 5 and 6, and the glass will be deposited on the table in the manner and with the results described above.

I am aware that it has already been proposed to empty a glass melting pot between a pair of horizontal rolls by slowly tilting the pot about the upper lip projecting across one of said rolls in such manner that the molten glass was caused to slowly flow from the pot onto the roll to be at once carried along by the devolving rolls without accumulating thereon in the form of a lump. Obviously, in an arrangement of this sort, the difficulties encountered and the drawbacks connected with the quick discharging of the contents of a melting pot on a stationary support in a coherent lump before starting the rolling operation do not arise at all.

In the drawings I have shown the preferred mode and means of carrying out my invention, but I wish it to be understood that this showing is merely diagrammatic and by way of example and should not be construed as limiting the scope of the appended claims to the exact mode of proceeding or to any constructional details shown and described, for many obvious modifications will occur to a person skilled in the art.

In my pending application Sr. No. 147,549, filed November 10th, 1926, as a continuation in part of my application Sr. No. 469,340, filed May 13th, 1921, I claim the method herein disclosed and also claim certain of the apparatus herein disclosed. My failure to claim the same herein is not therefore waiver of my rights to claims on the same, as the claims on this case are directed to the construction of the means for carrying and tilting the pot.

I claim:

1. Apparatus for depositing on a support a mass of molten glass contained in a melting pot, comprising a pot gripping fork and a cranked handle connected with said fork one shank of said fork and said handle extending substantially in the same vertical plane.

2. Apparatus for depositing on a support a mass of molten glass contained in a melting pot, comprising a pot gripping fork and a cranked handle connected with said fork, said fork and said handle extending in parallel horizontal planes distanced apart the distance between the plane of gripping and the upper edge of a pot, said handle and one shank of said fork extending substantially in the same vertical plane.

3. In an apparatus for depositing on a support a mass of molten glass contained in a tilting pot, the combination with a substantially horizontal bearing member having an offset pot gripping member rigidly connected therewith, means connected with the pot gripping portion to hold a pot with an edge thereof substantially in the line of the axis of the bearing member and a bearing in which the said bearing member is mounted for motion around its axis.

4. In an apparatus for depositing on a support a mass of molten glass contained in a tilting pot, the combination with a substantially horizontal bearing member having an offset pot gripping member rigidly connected therewith, and a second pot gripping member connected with the first named gripping member, the first named gripping member being below and substantially along the vertical plane of the axis of the bearing member when the pot is erect.

5. In an apparatus for depositing on a support a mass of molten glass contained in a tilting pot, the combination with a substantially horizontal bearing member having an offset pot gripping member rigidly connected therewith, and a second pot gripping member pivoted with the first named gripping member, the first named gripping member being below and substantially along the vertical plane of the axis of the bearing member, and the pivot between the two members being laterally offset in respect to said vertical plane, when the pot is erect.

In testimony whereof I affix my signature.

MAX BICHEROUX.